April 4, 1967   V. R. DUNN   3,311,957
SELF-LOCKING STRAP
Filed March 24, 1965
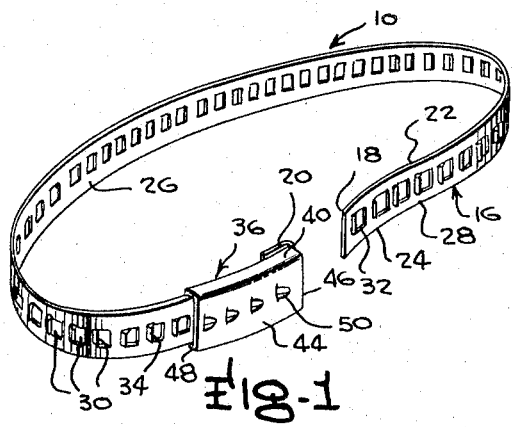
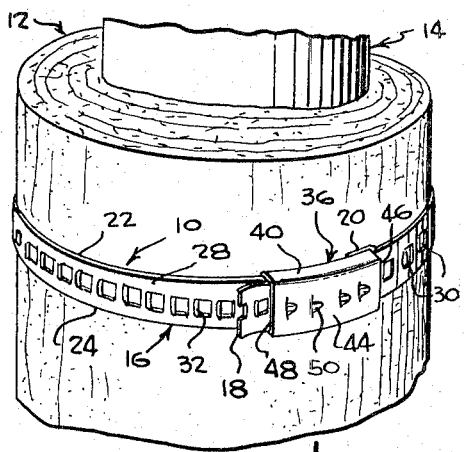
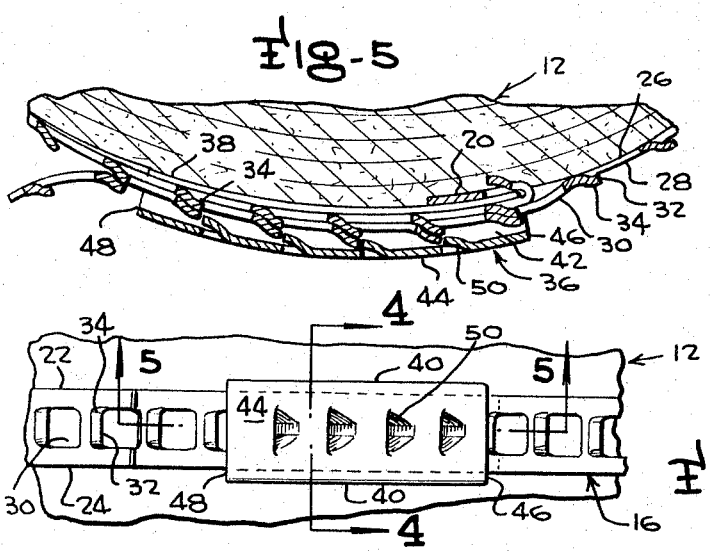
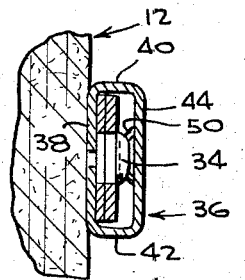
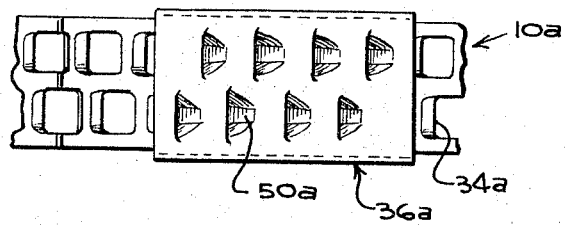
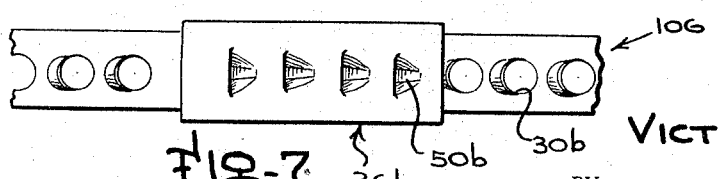
INVENTOR
VICTOR R. DUNN
BY Robert G. McMorrow
ATTORNEY

United States Patent Office 3,311,957
Patented Apr. 4, 1967

3,311,957
SELF-LOCKING STRAP
Victor R. Dunn, P.O. Box 1134,
Shreveport, La. 71101
Filed Mar. 24, 1965, Ser. No. 442,437
5 Claims. (Cl. 24—21)

The present invention relates to connection straps or bands of the type employed in the connection of pipe insulation about pipes, packaging, construction, and used in related arts. The strap assembly hereof finds particularly advantageous utility in the first mentioned environment.

It has been standard practice in the connection of fibrous and other types of insulation about pipes requiring such covering to employ bands or straps of variable diameter, often attached by binding, bending, or special clips. These previously known straps have been objectionable from the standpoints of difficulty of application and/or the possibility of damage to the pipe or insulation during installation. It is therefore an object of the present invention to provide an insulation connection strap assembly which is readily installed by one mechanic without assistance from others, and which may be applied without danger of damage to the pipe or insulation.

Another important object is to supply a pipe insulation connection strap assembly employed without the necessity for special tools, and which may be installed manually if desired.

A further object of primary importance resides in the provision of connection means as aforesaid which has inherent means positively preventing slippage or loosening following installation.

The invention, in achieving the objects set forth above, relates to a strap assembly wherein an elongated strap is provided which includes a continuous plurality of spaced engagement lips extending therefrom, the assembly further including a clip means, and the strap extending through the clip. The clip has tabs to engage the lips upon tightening of the strap to thereby prevent relative movement of the clip and strap in one direction.

Another object is to provide multiple locking means to prevent the loosening of the strap.

Other and further objects and advantages will become apparent from a consideration of the following specification when read in conjunction with the annexed drawing, in which:

FIGURE 1 is a perspective view of a first form of connection strap assembly, constructed and assembled in accordance with the teachings of this invention;

FIGURE 2 is a perspective view of the strap as applied to a pipe and its insulation;

FIGURE 3 is an enlarged plan view of a portion of the strap assembly;

FIGURE 4 is an enlarged, detail cross sectional view taken substantially on the line 4—4 of FIGURE 3, looking in the direction of the arrows;

FIGURE 5 is an enlarged longitudinal cross section on the line 5—5 of FIGURE 3, looking in the direction of the arrows;

FIGURE 6 is a view similar to FIGURE 3, but showing a modification; and

FIGURE 7 shows still another form of the device.

Proceeding to a more detailed description of the invention, as shown in FIGURES 1–5, the strap assembly hereof is generally identified by reference numeral 10. In FIGURE 2, the assembly 10 is shown in a typical environment of use, employed in the connection of fibrous insulation material 12 about a pipe 14, the strap assembly encircling the insulation.

The assembly 10 includes an elongated strap element 16 having a free end 18 and an opposite, clip retaining end 20. The strap 16 includes side edges 22 and 24, and inner and outer faces 26, 28. At substantially uniform, longitudinally spaced locations, the strap 16 has plural, aligned, substantially rectangular slots 30 formed therein and extending from the inner to the outer faces thereof. Each of the slots has a forward leading end wall 32.

The end walls 32 are outwardly bent or struck to provide outwardly inclined engagement lips 34, serving purposes described below in more detail.

For the securing of the strap in place about materials such as the pipe 14 and its insulation 12, the strap assembly further includes a clip 36. The clip 36 is of open, elongated curvilinear form viewed from the side to generally coincide with the curvature of the material to be bound by the assembly and includes a split bottom wall 38, opposite side walls 40, 42 and a top wall 44.

As best shown in FIGURE 5, the clip 36 has forward and rear ends 46, 48, respectively, and the strap 16 extends through the clip with the end 20 of the strap being reverted under the clip bottom wall at the clip end 46, thus connecting the clip to the strap at one end. As further shown in the figure referred to, it is preferable that at least one of the lips 34 be included in the reverted portion so that it becomes embedded in the material 12 during application to prevent slippage of the assembly.

Formed in the clip top wall 44 is a plurality of longitudinally aligned, inwardly struck tabs 50, inclined oppositely with respect to the lips 34. The tabs 50 are spaced for engagement with the lips.

In operation, the assembly is placed about the pipe and insulation to be strapped, and the strap free end 18 is extended through the clip to which the end 20 has been applied and reverted as described above and as shown in FIGURE 5. The engagement lips 34 of the strap, being similarly inclined as shown in FIGURE 5, pass over one another, and the opposite inclination of the tabs 50 permits movement of the strap in one direction. As the free end 18 is manually inserted abutment of the lips 34 and the trailing ends of the openings 30 is precluded inasmuch as there is sufficient clearance between the extended portion of the lips and tabs to prevent such malfunction, as clearly shown in FIGURE 5. However, retrogressive movement of the strap is precluded by reason of the fact that the lips are engaged by the tabs.

In FIGURE 6, a modification is disclosed, the letter "a" being added for distinction. In this form of the invention, both the lips 34a and tabs 50a are arranged in plural, transversely staggered rows to increase the efficiency of the connection.

A further modification is shown in FIGURE 7, wherein the openings 30b are of substantially circular form.

Having described and illustrated several forms of the invention in detail, it will be understood that these descriptions and illustrations are offered merely by way of example, and that the invention is to be limited in scope only by the appended claims.

What is claimed is:

1. An insulation connection strap assembly for securing fibrous insulation about a pipe or the like, the strap assembly comprising:
   an elongated, substantially rectangular, flexible metallic strap having a free end and an opposite clip retaining end;
   the strap having side edges and having inner and outer faces;
   the strap having a plurality of longitudinally aligned, generally rectangular slots formed therein, extending from the inner to the outer face thereof, each slot having a forward leading end wall;
   the slot forward end walls being outwardly struck to provide an engagement lip;
   an elongated, curved clip, of open, substantially rectangular form, including a bottom wall, side walls, and a top wall;

the clip having a forward and a rear end, and the clip retaining end of the strap being reverted about the forward end and underlying the clip bottom wall; and the clip top wall having a plurality of inwardly struck tabs thereon, longitudinally aligned to provide rearwardly facing engagement lips, spaced to engage the lips of the strap and to prevent movement of the strap in one direction with respect to the clip, whereby with the strap encircling the pipe and its insulation the free end of the strap is extended through the clip between the top and bottom walls and is engaged by the clip tabs to prevent retrogressive movement.

2. A connection strap assembly for engagement about an article, the assembly comprising:

an elongated strap element;

the strap element having a plurality of uniformly spaced apart engagement lips thereon;

an open clip member, the clip member having at least one inwardly projecting tab providing a rearwardly facing lip thereon;

the engagement lip of the strap and the tab lip being disposed in oppositely facing relation to one another;

the strap having a free end and a connection end, and the connection end of the strap being secured to the clip;

the inward extent of the tab with respect to the strap connection portion of the clip being such that movement of the strap is possible in one direction only and retraction of the strap is precluded; and the free end of the strap being engaged about the article and extended through the clip with the lips thereof engaged by the tabs of the clip.

3. The invention of claim 2, wherein:

the article to be enclosed has an outer surface; and the clip is shaped to the contour of said outer surface.

4. The invention of claim 2, wherein:

the strap has a plurality of slots formed therein adjacent the engagement lips, the slots being of generally circular form.

5. The invention of claim 2, wherein:

the strap has a plurality of slots formed therein adjacent the engagement lips, the slots being of generally rectangular form.

References Cited by the Examiner

UNITED STATES PATENTS

| 490,018 | 1/1893 | Goffett | 292—317 |
| 840,125 | 1/1907 | Foote | 292—317 |
| 1,173,998 | 2/1916 | Depew | 292—325 |
| 1,511,607 | 10/1924 | Hamby | 24—21 |

FOREIGN PATENTS

| 307,749 | 5/1930 | Great Britain. |
| 319,124 | 9/1929 | Great Britain. |

JAMES L. JONES, JR., *Primary Examiner*.